US008418059B2

(12) United States Patent
Kitada

(10) Patent No.: US 8,418,059 B2
(45) Date of Patent: Apr. 9, 2013

(54) EDITING APPARATUS AND EDITING METHOD

(75) Inventor: Atsushi Kitada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1043 days.

(21) Appl. No.: 11/949,917

(22) Filed: Dec. 4, 2007

(65) Prior Publication Data

US 2008/0141123 A1  Jun. 12, 2008

(30) Foreign Application Priority Data

Dec. 7, 2006 (JP) ................................. 2006-330693

(51) Int. Cl.
*G06F 17/00* (2006.01)
(52) U.S. Cl.
USPC ............................ 715/275; 715/255; 715/273
(58) Field of Classification Search .................. 715/255, 715/273, 275
See application file for complete search history.

(56) References Cited

U.S. PATENT DOCUMENTS

| | | | | | |
|---|---|---|---|---|---|
| 5,467,441 | A | * | 11/1995 | Stone et al. | 345/619 |
| 5,615,320 | A | * | 3/1997 | Lavendel | 345/594 |
| 6,058,207 | A | * | 5/2000 | Tuijn et al. | 382/162 |

FOREIGN PATENT DOCUMENTS

| | | | |
|---|---|---|---|
| JP | 07-093507 | A | 4/1995 |
| JP | 07-306935 | A | 11/1995 |
| JP | 08-055119 | A | 2/1996 |
| JP | 2000-254352 | A | 9/2000 |
| JP | 2005-043942 | A | 2/2005 |
| JP | 2005-235198 | A | 9/2005 |
| JP | 2006-058950 | A | 3/2006 |
| JP | 2006-092184 | A | 4/2006 |

OTHER PUBLICATIONS

Elaine Weinmann and Peter Lourekas; Photoshop 6 for Windows and Macintosh: Visual QuickStart Guide; Jan. 25, 2001; Peachpit Press; pp. 83-85, 339-344, 351-352, and 416-419.*
Mary Campbell; Teach Yourself WordPerfect 5.1; 1990; McGraw-Hill, Inc.; pp. 482-486.*
Sharon Steuer, The Illustrator 8 Wow! Book (Japanese Translation), 2000, p. 48, Agosto, Tokyo, Japan.

* cited by examiner

*Primary Examiner* — Doug Hutton, Jr.
*Assistant Examiner* — Andrew Dyer
(74) *Attorney, Agent, or Firm* — Canon USA Inc IP Division

(57) ABSTRACT

An editing apparatus includes a designating unit configured to designate a color for use in an image including a plurality of objects, according to an instruction by a user, a determining unit configured to determine a combination of colors corresponding to the color designated by the designating unit, and a specifying unit configured to specify colors of the plurality of objects included in the image, by using the combination of colors determined by the determining unit.

19 Claims, 17 Drawing Sheets

FIG. 6

| RECORD | MAIN COLOR | SUB COLOR 1 | SUB COLOR 2 |
|---|---|---|---|
| 1 | M1 | S11 | S12 |
| 2 | M2 | S21 | S22 |
| 3 | M3 | S31 | S32 |
| 4 | M4 | S41 | S42 |
| 5 | M5 | S51 | S52 |
| 6 | M6 | S61 | S62 |

| RECORD | REFERENCE COLOR | GENERATED COLOR 1 | GENERATED COLOR 2 |
|---|---|---|---|
| 1 | EXTRACTED COLOR | (SAME HUE, BRIGHTNESS, +30%) | |
| 2 | EXTRACTED COLOR | (SAME HUE, BRIGHTNESS, +30%) | (SAME HUE, BRIGHTNESS, -30%) |
| 3 | EXTRACTED COLOR | (SAME HUE, SATURATION, +30%) | (SAME HUE, SATURATION, -30%) |
| 4 | EXTRACTED COLOR | (SAME HUE, BRIGHTNESS, +30%) | (SAME HUE, SATURATION, -30%) |
| 5 | PURE COLOR | (SAME HUE, BRIGHTNESS, +30%) | |
| 6 | PURE COLOR | (SAME HUE, BRIGHTNESS, +30%) | (SAME HUE, BRIGHTNESS, -30%) |
| 7 | PURE COLOR | (SIMILAR HUE, +1, BRIGHTNESS, +30%) | |
| 8 | PURE COLOR | (SIMILAR HUE, +1, BRIGHTNESS, -30%) | (SIMILAR HUE, -1, BRIGHTNESS, 0%) |
| 9 | PURE COLOR | (FIXED COLOR, HSV(0, 0, 80%)) | |
| 10 | PURE COLOR | (SAME HUE, BRIGHTNESS, +30%) | (FIXED COLOR, HSV(0, 0, 20%)) |
| 11 | PURE COLOR | (COMPLEMENTARY COLOR, BRIGHTNESS, +30%) | |
| 12 | PURE COLOR | (COMPLEMENTARY COLOR, SATURATION, +30%) | |

1301

EDITING APPARATUS AND EDITING METHOD

BACKGROUND OF THE INVENTION

1. Field of the Invention

The present invention relates to an editing apparatus, a method, and a program for displaying text or image data stored in a storage device on a display unit.

2. Description of the Related Art

Up to now, various types of application software have been released, which are executed on a personal computer to produce page design files of a poster, a catalogue, presentation data, a postcard, a leaflet, or an advertisement. A well-known desktop publishing (DTP) function is installed in the software for producing page design files. That is, the software is equipped with a printing function for printing out data with a printer as well as a function for editing a layout of design elements on a page, such as an image, characters, or clip art, a shadow-casting function for shadowing an image or characters, and a function for applying a decorative effect to an image or characters.

Page design applications can be classified into two types: an expensive and advanced application designed for a professional graphic designer and a relatively inexpensive and general-purpose application featured by simple operation and processing. The former places emphasis on the range or diversity of functions rather than an operability so as to more precisely reflect an idea of a graphic designer in many cases. Thus, a general user is unwilling to use this application because of a lot of bother in mastering it. On the other hand, the latter is intended for a user who can operate office applications, such as an operating system (OS), a word processor, and a spreadsheet, to some degrees. Therefore, an operation up to a process of printing the page design is simplified, and a product that not only performs an editing operation but also guides a generation flow up to print settings appears on the market.

Most of the applications for general users include materials for efficiently producing a page design, such as predesigned design template (template), clip art, or photos for the purpose of achieving a high-quality page design with a simple operation. A user completes a page design following a procedure of selecting a design template that matches renderings of an intended page design and editing a page, such as replacing a photo, editing text, adding another material, or applying a decorative effect as appropriate. A general user, who does not have adequate knowledge about a layout design/color design, needs to consume a lot of time to develop an intended page design from the start, and the completed one is not necessarily desirable in terms of design. The desirable page design here means a condition that readers/viewers of the page design can accurately interpret a user's message or intent, and the designed page is easy to read and, if possible, makes a strong impression on the readers/viewers. To generate such a page design, a user needs to have a basic knowledge and know-how about a design, such as a layout or coloration.

Recently, the following method has become standard in an operation of generating a page design. That is, a desired design is selected from sample design plates and an editing operation is performed on the design. In addition to the method, there is known a method of designating a design image that determines an impression on page design readers/viewers to generate variations of layout or coloration of the page design and allowing a user to select an appropriate one that matches an intended image from the variations.

Japanese Patent Application Laid-Open No. 07-093507 discusses a method of pairing a sample having a completed design, such as a photo, a painting, or a poster, and a color and coloration object characteristically used in the sample to generate a database, and determining coloration of the whole page design based on the sample in the database. According to the method, a page design can be obtained with coloration that is close to the coloration of the sample and is refined throughout. Also, coloration can be determined on another sample that is read from outside the database, based on an extracted color and coloration object of the sample.

Japanese Patent Application Laid-Open No. 07-306935 discusses a method that allows a user to select a coloration image that determines an impression about a page design to thereby determine the most important color of the image, produces the other colors that match the most important color, combines the colors, and color the page design. For that purpose, a database is provided to store coloration images selected by a user. According to this method, an impression about a generated page design can be easily made to match a user's request.

In recent years, application software that dynamically generates a page design based on page components, purposes, and conditions designated by a user, has been released. This application provides a method for dynamically generating several hundreds of page designs in response to an input of an image, clip art, text, or page orientation on the page design to allow a user to select an appropriate one. The generated page design is displayed in a thumbnail view on a two-dimensional coordinate system where the horizontal axis represents whether a background design is included and the vertical axis represents a size of a main subject. The above-described display method helps a user in imagining which design is used in which position among a group of generated designs upon selecting a desired design. In addition, the user can select a coloration image that determines an impression about the selected page design. To describe a background to the development of the coloration technique, a color pallet and plural combinations of colors of the color pallet (color variation) are defined for each coloration image. The user can select a coloration image and a color variation that belongs to the selected coloration image. These techniques comprehensively support user's operations for generating a page design.

Hitherto, many page design applications have provided design templates. A user can select a template that matches an intended image, from the design template group, and replace or add images or characters as appropriate. However, the design templates have completed coloration. Thus, if a user having little design knowledge changes the coloration, the coloration tends to be corrupted especially in the case of adding or replacing a photo.

Any of the above-described methods is effective as a method of determining coloration of the entire page for giving a desired impression to readers/viewers of the page design. However, in the above-described condition in which a user lays out an image on the page design by himself/herself, the coloration of the whole page design including the image is not based on the image. Therefore, the image does not match the page design well in many cases.

The method discussed in Japanese Patent Application Laid-Open No. 07-093507 can extract a color of apart of an image and use the extracted color for coloration of a page design. However, the color can be applied to a limited portion, such as a foreground or background. Thus, it is necessary to extract more colors for a page design including many elements, so that this method is inefficient. Further, which color is extracted and where the color is arranged are determined by a user. Therefore, if a user having little design knowledge generates a page design, the coloration of the completed page design is less likely to be desirable in terms of design.

The method discussed in Japanese Patent Application Laid-Open No. 07-306935 automatically generates and displays plural coloration candidates according to a user's input to give an intended impression to readers and thus can change the original design to a desired deign with ease and efficiency. However, in the case of laying out user's own image data, such as a photo taken by a user, on a page design, colors of the image cannot be corrected or the total coloration cannot be determined based on the image. Therefore, desirable coloration, in which the image fits in the page design, is not necessarily attained throughout the whole page design.

In the page design application, the total coloration cannot be determined when an automatically generated page design is being edited. Therefore, coloration is more likely to be imbalanced unless colors are manually set as appropriate upon adding an image or text.

Therefore, in order for a general user having little design knowledge to generate a more desirable page design in terms of design, the total coloration of a page design including a user's image should be determined. In addition, the general user is required to have a technique for arranging colors in a simple and efficient manner at any desired time.

SUMMARY OF THE INVENTION

According to an aspect of the present invention, an editing apparatus includes a designating unit configured to designate a color for use in an image including a plurality of objects, according to an instruction by a user, a determining unit configured to determine a combination of colors corresponding to the color designated by the designating unit, and a specifying unit configured to specify colors of the plurality of objects included in the image, by using the combination of colors determined by the determining unit.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a coloration pattern database for use in a page design application according to an exemplary embodiment of the present invention.

FIG. 13 illustrates a coloration pattern generation rule database for use in a page design application according to an exemplary embodiment of the present invention.

DETAILED DESCRIPTION OF THE EMBODIMENTS

Various exemplary embodiments, features, and aspects of the invention will be described in detail below with reference to the drawings.

Hereinafter, description is given of a coloration variation automatic generating function executed as a part of application software installed on a personal computer (PC) according to exemplary embodiments of the present invention with reference to the accompanying drawings. Conceivable examples of a page design to be edited with the application include any document including colorable raster data, vector data, or character data, such as a general office document and a document intended for specific purposes like a poster, a postcard, or presentation data. Further, the page design application has various functions for editing a page design and thus can resize, move, and rotate page elements, correct an image, edit text, decorate a photo or text, and set a background. In the following description, a first exemplary embodiment focuses on processing based on a coloration database (DB) that statically stores data, and a second exemplary embodiment focuses on processing for dynamically generating a coloration pattern based on an extracted color. Further, a third exemplary embodiment focuses on processing for automatically analyzing colors in a designated area and displaying candidates for color extraction.

First Exemplary Embodiment

Figure 1:
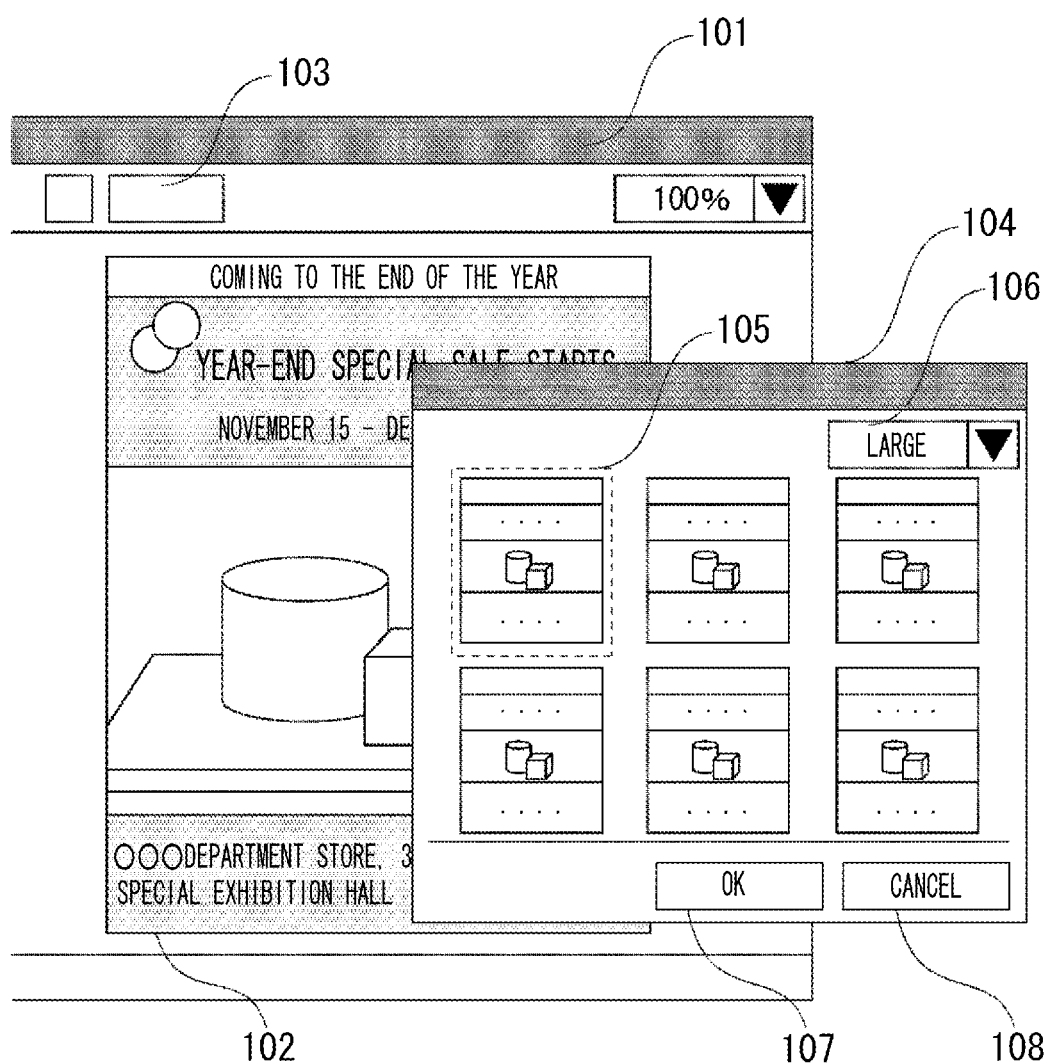
FIG. 1 illustrates an example of a screen that displays coloration variations according to an exemplary embodiment of the present invention.

FIG. 1 illustrates an example of a screen that displays coloration variations according to an exemplary embodiment of the present invention. In the illustrated example, coloration variations of a page design under editing, which are generated based on an extracted color of the page design, are displayed in a thumbnail view. If a desired coloration design is included, a user can replace the page design under editing by the selected coloration design only by selecting a corresponding thumbnail image from the page design list and clicking an OK button 107 on the screen.

A main screen 101 of the page design application includes a screen for displaying a list of design elements (hereinafter collectively referred to as "artwork"), such as a menu corresponding to various types of processing, a tool bar, a button, a photo, clip art, a photo frame, character decoration, and background. Further, the application includes an area 102 for displaying a selected page design in a document to be edited (hereinafter referred to as "preview area"). In the preview area 102, elements of the page design (hereinafter collectively referred to as "object") can be moved or resized. An operation of entering the command or user operation is performed with an input device, such as a mouse or keyboard connected to the PC.

In the preview area 102, the whole page design that is being edited is displayed. In the present exemplary embodiment, a document of one page is edited. However, a document of plural pages can be edited. In this case, the application needs to wait for input of a command to skip to any page so as to move to a page designated by a user. In addition, the application can have a function of supporting an editing process, such as a guide, a grid, or ruler, so as to smoothly lay out an object in an intended position.

A coloration variation generating button 103 is located on the tool bar of the main screen 101. The tool bar includes another processing button and a dropdown list for designating display scaling of the preview area 102. When the coloration variation generating button 103 is selected, the application shifts to a color extraction mode. If a color in a desired position is selected in the color extraction mode, a plurality of page designs that reflect color patterns generated based on the extracted color are automatically generated and displayed on a coloration design candidate screen 104.

The coloration variation display screen 104 displays page designs automatically generated in response to the selection of the coloration variation generating button 103 in a thumbnail view. In any thumbnail, the entire page design is displayed, so that a user can easily check how an impression about a page design is changed according to the change in coloration design. Further, a main color and sub colors used for coloration can be additionally displayed as actual colors under the thumbnail images of each generated page design.

If the OK button 107 is selected, a page design 105 that is being selected is displayed in the preview area 102. At this time, if a page design in the preview area 102 is being edited and not yet stored in a file system of the PC, the application displays a warning message to prompt a user to save the page design.

A dropdown menu 106 is operable for resizing a generated page design image to select a display size from among a large size, a middle size, and a small size.

A procedure from selecting the coloration variation generating button 103 up to displaying the page design list is described in detail below.

Figure 2:
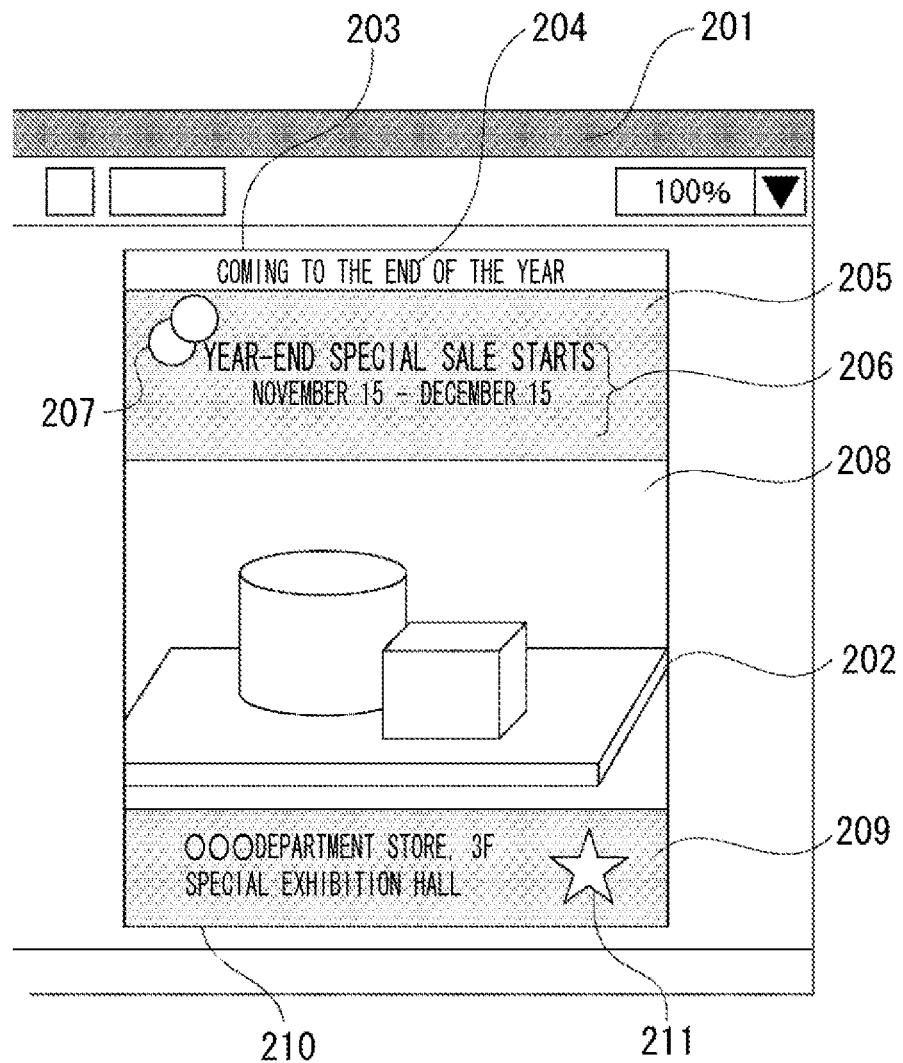
FIG. 2 illustrates a displayed page design under editing according to an exemplary embodiment of the present invention.

FIG. 2 illustrates a page design that is being edited by the application according to an exemplary embodiment of the present invention.

A main screen 201 of the page design application is similar to the main screen 101. A page design 202 under editing is displayed in the preview area. In the page design 202, plural objects are laid out. That is, text 204, 206, and 210, a photo object 208, clip art 211, a circle as a kind of graphics 207, rectangles 203 and 205, and a background 209 are laid out. Among those, colors of text, rectangle, background, and clip art can be changed and thus are objects as a coloration target.

The page design application has a function of changing colors of the entire vector image including the target objects, such as a background or clip art, based on a designated color. If the vector image is composed of one area, the entire vector image is set to the designated color. On the other hand, the vector image is composed of plural areas, the areas are divided into a main area having a reference color (area that determines an impression about the whole vector image) and the other areas. Colors of the other areas (hereinafter referred to as "the other area color") are determined based on the reference color. A relationship between the reference color and the other area color is defined for each vector image. For example, a certain vector image can have a rule that the other area color has a predetermined difference in brightness from the reference color. Thus, if colors of the vector image are designated to change the coloration of the whole vector image, visual impressions can be largely changed.

A well-balanced coloration design is such that the entire page design has an organized and harmonized coloration. To attain the well-balanced coloration, colors of the individual objects need to be arranged in a well-balanced manner. In the case of laying out a natural image like a photo, colors of the other objects need to be arranged so as to match colors of the photo or an impression thereof and an emphasized color (hereinafter referred to as "accent color") of the photo image. Further, if a design or coloration is determined from the start, a photo that matches the design or coloration can be selected.

Figure 3:
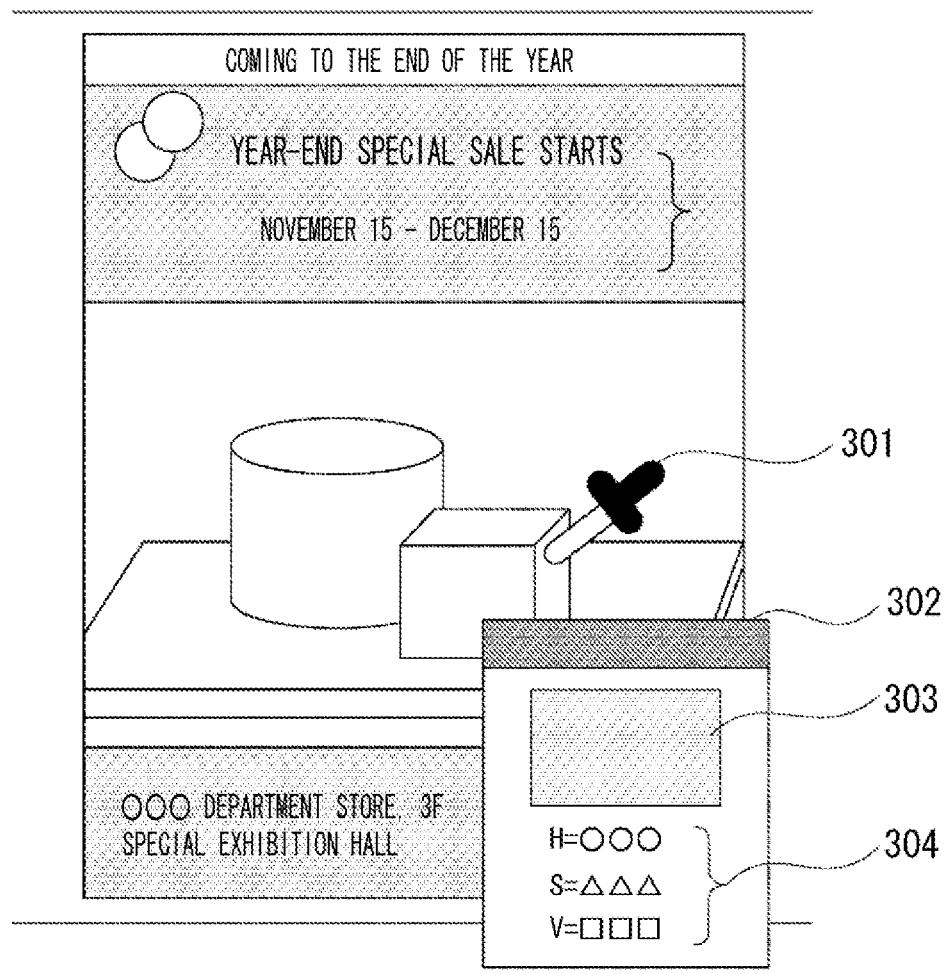
FIG. 3 illustrates a screen in a condition where a page design application is in a color extraction mode according to an exemplary embodiment of the present invention.

FIG. 3 illustrates a screen in a condition where the page design application is in the color extraction mode according to an exemplary embodiment of the present invention.

A cursor 301 selected in the color extraction mode is displayed as a color picker in the form of a dropping pipette. The color picker has a function of extracting a color of a pixel pointed by the cursor 301.

An extraction color display screen 302 displays a color of a pixel on the image pointed by the cursor 301 and values of the color. Color information about the extracted color is changed according to movements of a mouse. Compared with a solid vector image, a natural image, such as a photo, involves variations in color between adjacent pixels. To respond to such a situation, upon the color extraction, colors of a pixel pointed by the cursor 301 and pixels surrounding the pixel are averaged and extracted. For example, colors of the pixel pointed by the cursor 301 and eight pixels surrounding the pixel on all sides are extracted and averaged, and an averaged color is displayed on the extraction color display screen 302.

Fields 303 and 304 indicate color information of the pixel pointed by the cursor 301 in the form of actual color and color values. In the field 303, the extracted color is displayed in the solid form. The field 304 is represented by HSV values of a color space model composed of three elements: hue (H), saturation (S), and value (brightness) (V). H, S, and V are determined in a range of 0 to 360°, 0 to 100%, and 0 to 100%, respectively. In the illustrated example, the HSV color space is used, but the other color space can be used or the color space can be replaced. For example, HSV values and RGB values can be switched from each other or both of the values can be displayed at the same time.

A color to be extracted is determined according to mouse click in the color extraction mode, and the extraction color display screen 302 is closed. Then, processing for generating a coloration variation and displaying a thumbnail thereof is performed as described below.

Figure 4:
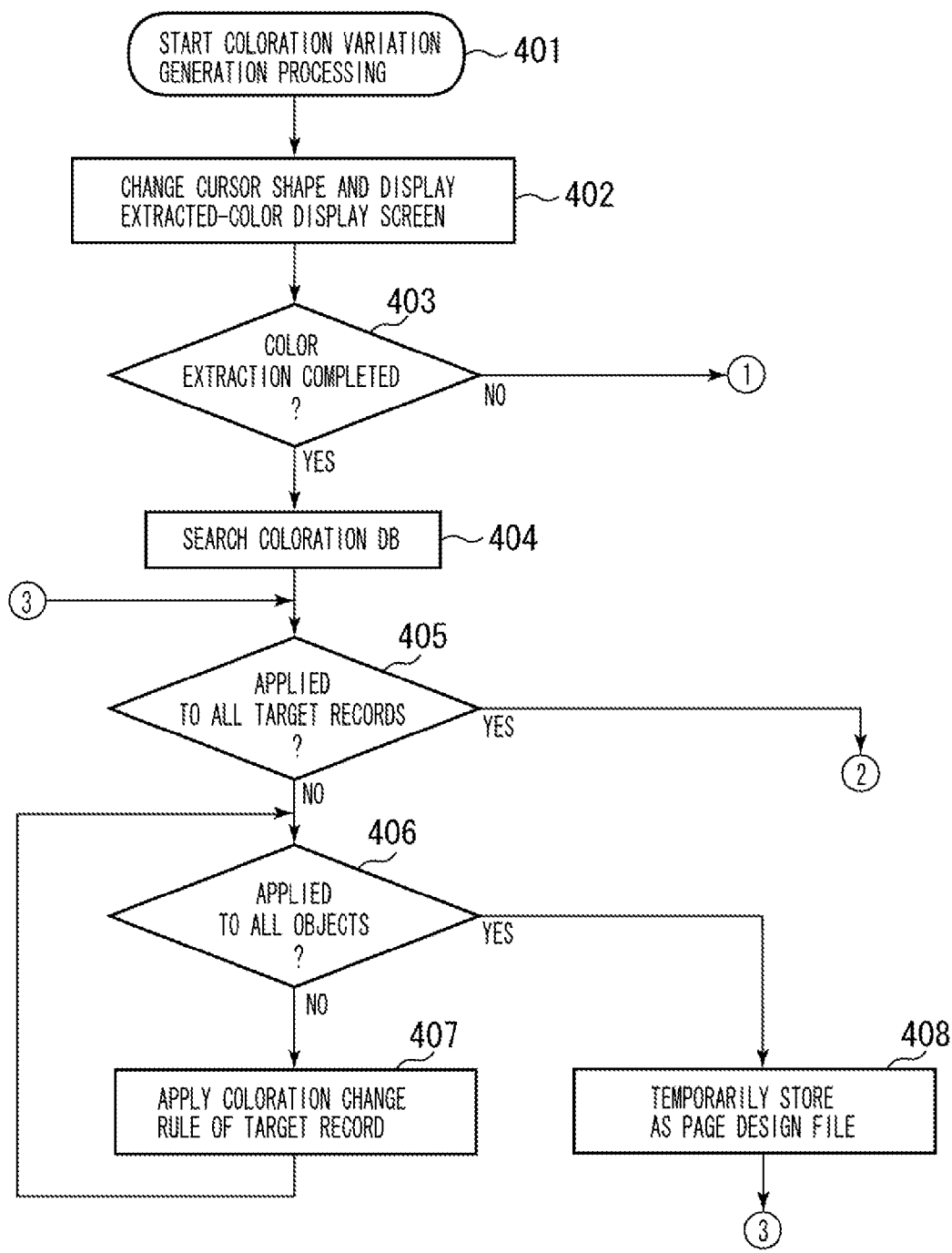
FIG. 4 illustrates the first half of a processing flow for generating a coloration variation based on an extracted color on a page design according to an exemplary embodiment of the present invention.
Figure 5:
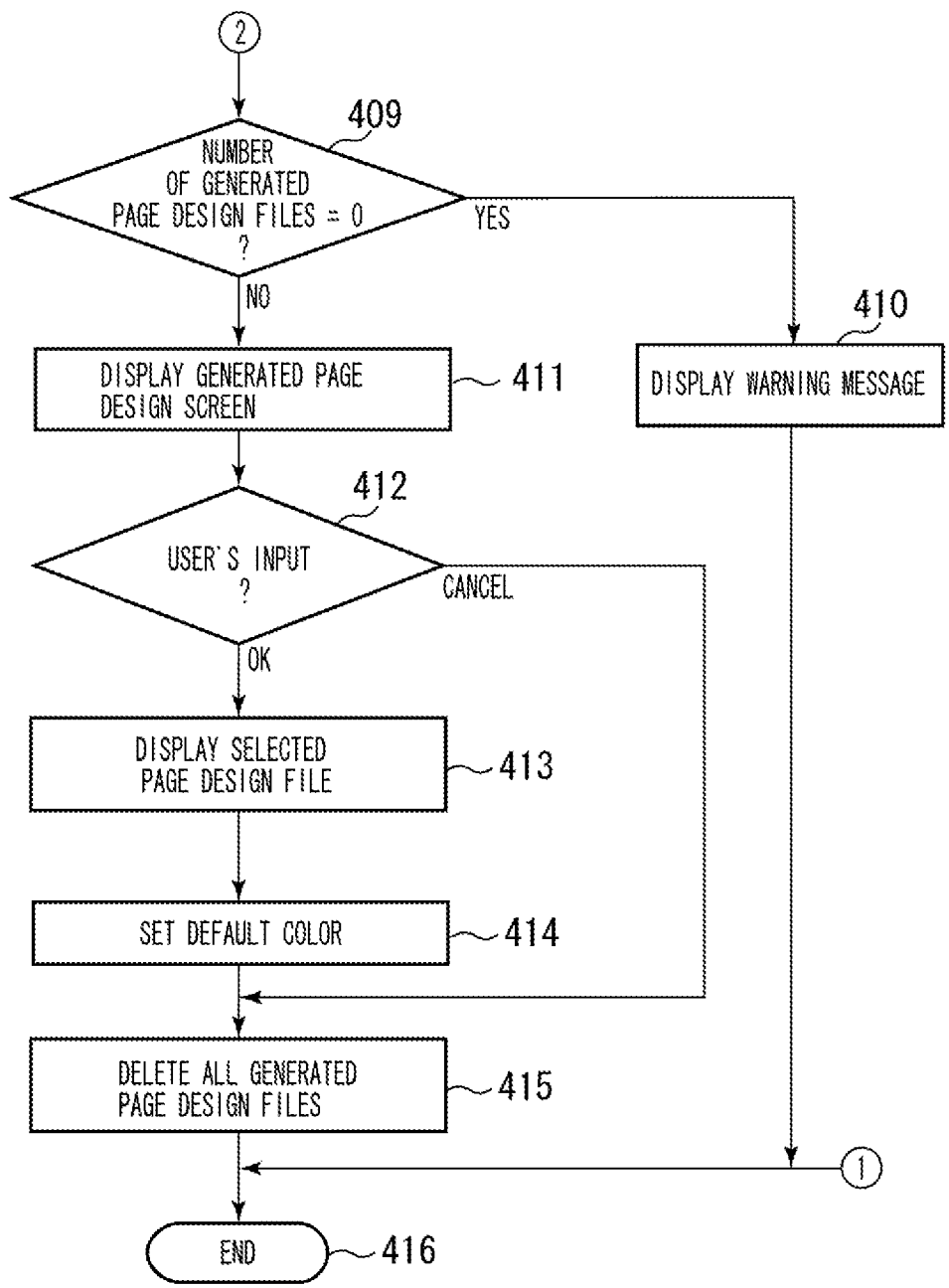
FIG. 5 illustrates the second half of the processing flow for generating a color variation based on an extracted color on a page design according to an exemplary embodiment of the present invention.

FIGS. 4 and 5 illustrate a processing flow for generating a color variation based on an extracted color on a page design according to an exemplary embodiment of the present invention. The application searches for a statically defined coloration pattern having the same color as the extracted color and generates a coloration variation reflecting the color of the coloration pattern.

In step 401, the coloration variation generation processing is started, in other words, the coloration variation generating button 103 is selected. In step 402, the application shifts to the color extraction mode, changes a shape of the cursor 301 to a dropping pipette design, and displays the extraction color display screen 302.

In step 403, the application determines whether a color to be extracted is selected. If selected (YES in step 403), the process advances to step 404 for searching the coloration database. If not selected (NO in step 403), the process advances to step 416 for terminating coloration variation generation. If a user clicks a mouse, a color of a pixel pointed by the cursor 301 is selected as a reference color of the coloration variation. If a button or menu for canceling the color extraction mode, a reference color is not determined, and the coloration variation generation is cancelled.

In step 404, the application searches a coloration pattern based on the reference color extracted in step 403 from the coloration pattern database. The coloration pattern database is described in detail below with reference to FIG. 6. Here, processing for searching a coloration pattern having a main color similar to the reference color is carried out. Each color has three color information as parameters, and a range of each parameter value is wide, so that a lot of colors can be expressed. Therefore, in step 404, whether the main color and the reference color are identical to some degrees is checked instead of checking whether the two colors are completely identical. More specifically, hue H is divided into 10 hue regions, and it is determined whether the main color and the reference color are within the same hue region. The application stores a record number of a coloration pattern having a main color similar to the reference color in the form of color arrangement, and the record number is used in subsequent coloration pattern applying processing.

In steps 405 to 408, the application repeats processing for generating a page design by applying each coloration pattern retrieved in step 404 to the objects on the page design, and storing the generated page design in the temporary storage directory. In step 405, if it is determined that any coloration patterns remain to be applied (NO in step 405), then in steps 406, 407, and 408, processing for changing coloration of each object is repeatedly carried out. If no coloration pattern remains to be processed (YES in step 405), that is, all coloration patterns are applied, the process advances to processing of step 409.

Steps 406 and 407 correspond to processing for applying colors of the coloration pattern in order based on object on the page design under editing. For example, presume that the number of colorable objects is five (obj1, obj2, obj3, obj4, and obj5) and the number of coloration patterns is three (c1, c2, and c3). In this case, the coloration pattern c1 is applied to the objects obj1 and obj4, the coloration pattern c2 is applied to obj2 and obj5, and the coloration pattern c3 is applied to obj3. As described above, if a target object is a vector image including a main area and the other area, the color is applied to the main area, and colors determined based on the rule defined in the vector image are applied to the other area.

Incidentally, the processing for applying a rule is performed on data as a copy of a page design so as not to affect the page design displayed on the preview screen. At this time, the data can be copied to a memory or file system. If the design change rule is applied to page design data copied to the memory, the application result is also stored in the memory.

Processing for generating a variation where applicable colors are arranged in different order can be additionally performed by use of the processed coloration pattern. That is, in the above case where the number of colorable objects is five and the number of coloration patterns is three, the coloration patterns c3, c2, and c1 can be applied in this order to generate a coloration variation. In this case, another page design in which the coloration pattern c3 is applied to the objects obj1 and obj4, the coloration pattern c2 is applied to the objects obj2 and obj5, and the coloration pattern c1 is applied to the object obj3 is generated.

In step 408, the application stores page design data subjected to coloration processing in steps 406 and 407 in the temporary storage directory on the file system. At this time, the file can be saved with any unique name in the temporary storage directory. The temporary storage directory is described in detail below.

In step 409, the application counts the number of page design files stored in the temporary storage directory. If the count value is zero (YES in step 409), the application advances to step 410, where the application displays a warning message indicating that the coloration pattern database includes no coloration pattern having a main color belonging to the same hue group or processing is suspended due to any error, and terminates the processing in step 416. Conceivable error factors include such a situation that a generated page design cannot be saved owing to lack of an available free space of the file system. If the count value is not zero (NO in step 409), the application advances to step 411

In step 411, the application displays the coloration variation display screen 104 and a list of all page designs stored in the temporary storage directory with a small size. The reduced-size image of the page design to be displayed is image information included in the page design file. A format of the page design file is described in detail below.

In step 412, the application waits for a user to enter a command on the coloration variation display screen 104. If the user selects the OK button 107 on the screen 104 (OK in step 412), the application advances to step 413, where the application performs processing for displaying the selected page design. If a CANCEL button 108 is selected in step 412 (CANCEL in step 412), the application advances to step 415, where the application deletes all page designs stored in the temporary storage directory.

In step 413, the application performs processing for opening a page design file corresponding to an item selected on the page variation display screen 104 and displaying the fine on the page preview. Here, it is assumed that if a displayed page design is not yet saved, a warning message is displayed as described above; this processing is included in step 413.

In step 414, the application sets a color of the coloration pattern used for generating the page design as a recommended color on a screen for setting attributes of an colorable object. An object, such as text or graphics, can be added even after the page design is selected. In such cases, it is ensured that a color of the coloration pattern can be easily selected on the object attribute setting screen while keeping a coloration balance of the entire page at the time of changing a color of the object. Thus, an editing operation can be continued without losing the coloration balance.

In step 415, the application deletes all page designs saved in step 408 from the temporary storage directory. Then, in step 416, the application closes the coloration variation display screen 104 and terminates the coloration variation generation processing.

FIG. 6 illustrates a coloration pattern database 601 for use in the application according to an exemplary embodiment of the present invention.

As described above, in the coloration variation generation processing, colors to be actually arranged are selected from the coloration pattern defined in the coloration pattern database 601. The coloration pattern is defined based on knowledge about color design and coloration and how-to-design and thus the colors are well balanced in terms of design. For example, a coloration pattern introduced in a coloration text can be used. Further, it is desirable to define the coloration pattern such that main colors and corresponding coloration patterns all belong to 10 hue groups in order to compare the colors with every conceivable reference color. Incidentally, it is difficult to define many main colors for some hues. Thus, the number of main colors can be different between hue groups.

In the coloration pattern database 601, three coloration patters, a main color, a sub color 1, and a sub color 2, are defined. According to an exemplary embodiment of the present invention, the number of hues defined in the coloration pattern is not limited. That is, as long as a color-balanced design is achieved, some coloration patterns can include only one sub color or three sub colors. However, in general, the more the number of hues in the coloration pattern, the less the number of matched combinations. Therefore, in the coloration pattern database 601, most patterns can include one or two sub colors. Incidentally, data in the coloration pattern database 601 is defined as color information on the HSV color space but can be defined as a value on the other color space, such as an RGB value.

Figure 7:
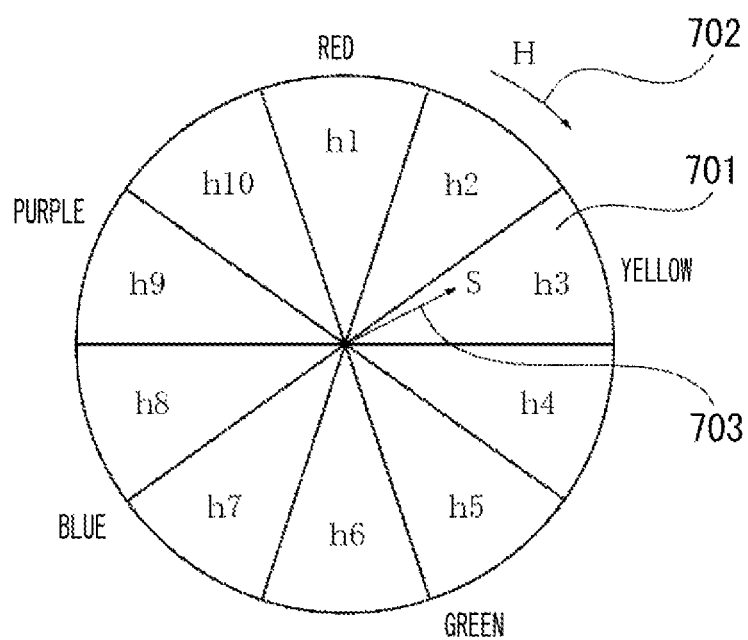
FIG. 7 illustrates an example in which hue is divided into 10 hue groups to explain definition of a main color determined in a coloration pattern database according to an exemplary embodiment of the present invention.

FIG. 7 illustrates an example in which hue is divided into 10 hue groups to explain definition of a main color determined in the coloration pattern database 601 according to an exemplary embodiment of the present invention. FIG. 7 is also a schematic sectional view illustrating a well-known HSV color space.

A block 701 represents a group h3 as one of the divided hue groups h1 to h10, and yellow or a color having a hue similar to yellow belongs to the group h3. In FIG. 7, although hue is equiangularly divided into hue groups, an area can vary among hues. The arrow 702 indicates a direction in which a hue value increases. That is, a hue is changed in the order of red, yellow, green, blue, and purple according to an increase in hue value from 0 to 360 degrees. The arrow 703 indicates a direction in which saturation is increased. A color having higher saturation is vivid; a color having lower saturation is muddy due to the high degree of mixture of gray. Although not illustrated, the brightness is defined in a direction of the normal of the circle, that is, in a direction of increasing a distance from the drawing sheet, and color becomes pale and light as the brightness increases. The HSV space can be represented three-dimensionally in the conical or cylindrical form, and in the present exemplary embodiment, any form can be used.

Figure 8:
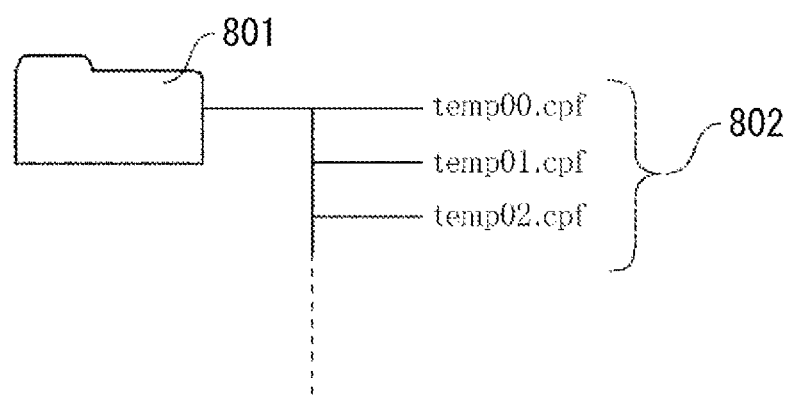
FIG. 8 is a schematic diagram illustrating a temporary storage directory for use in a page design application according to an exemplary embodiment of the present invention.

FIG. 8 is a schematic diagram illustrating a temporary storage directory for use in the application according to an exemplary embodiment of the present invention. A directory 801 contains page design files 802 generated in the coloration variation generation processing. The number of page design files 802 corresponds to the number of successfully applied coloration patterns. The page design files are automatically deleted after the completion of generating the coloration variation. The temporary storage directory can be statically kept by the application or can be changed by a user as appropriate according to the configuration of the PC.

Figure 9:
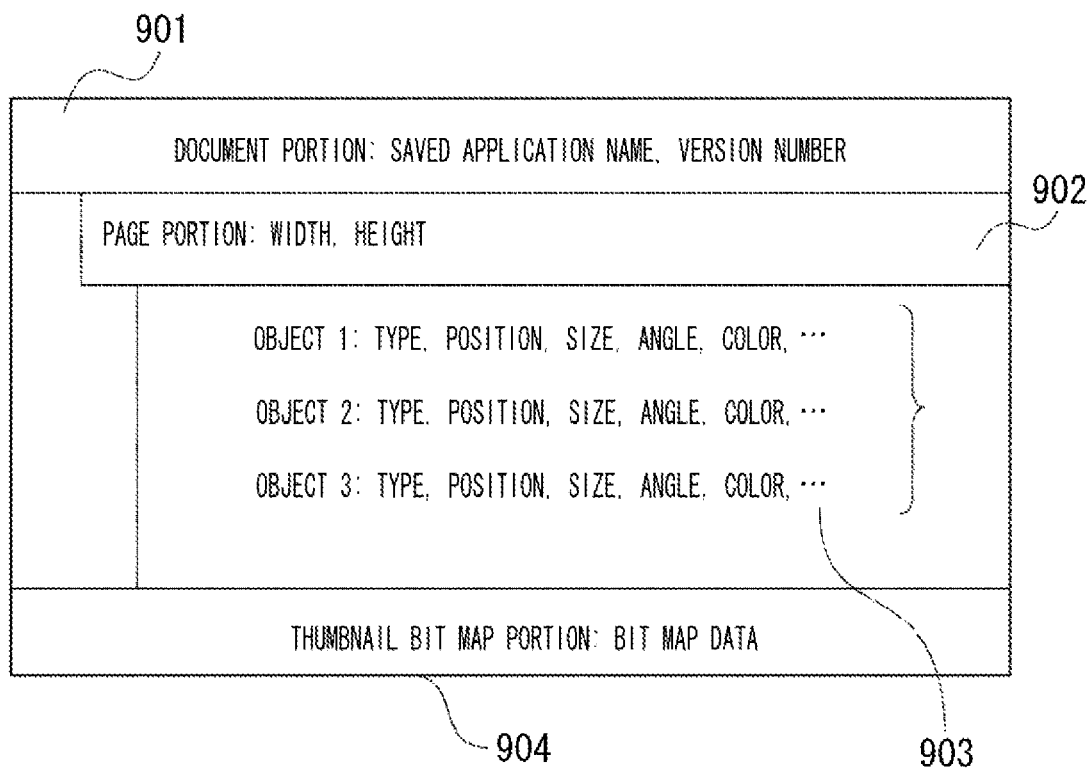
FIG. 9 illustrates a format example of a page design file according to an exemplary embodiment of the present invention.

FIG. 9 illustrates a format example of a page design file for use in the application according to an exemplary embodiment of the present invention. In a field 901, a version name of the application that generated the page design file, which determines attributes of the whole page design, is stored. In fields 902 and 903, page information is stored. In some cases, a document includes plural pages. In such cases, information in the fields 902 and 903 is stored repeatedly. The field 902 stores information specific to the page, e.g., a page size, a margin, and a background object. The field 903 stores information used as attributes of an object group of the page design, such as an object type or size, rotation, decoration such as a photo frame or a character decoration, and an applicable color. In the field 904, bit map data of a thumbnail image of the page design is defined, which is used on the coloration variation display screen 104. Upon target page design saving processing, the page design is rendered at low resolution, and the rendering result is stored as a bit map in the field 904.

Figure 10:
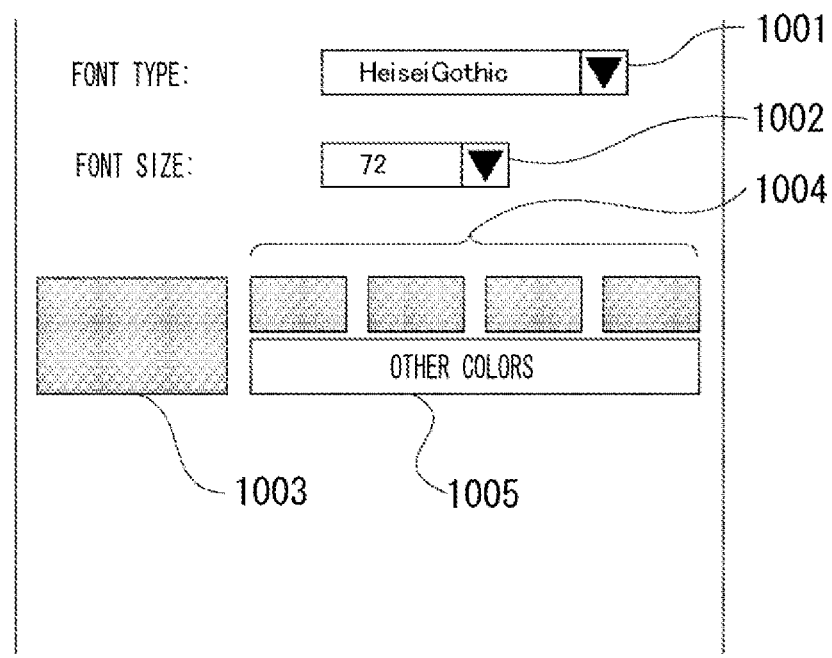
FIG. 10 illustrates a text attribute setting screen for use in a page design application according to an exemplary embodiment of the present invention.

FIG. 10 illustrates a text attribute setting screen for use in the application according to an exemplary embodiment of the present invention. FIG. 10 also illustrates how a color in the coloration pattern of the selected page design as one processing target in step 414 is set as a recommended color on the text attribute screen.

A dropdown list 1001 is used to change a font type of text selected on the page preview as well as displaying a current font type. A dropdown list 1002 is used to change a font size as well as displaying a current font size.

A selected color display area 1003 is used to display a color of the current text, and data in the area 1003 cannot be changed at all. Hence, each time text is selected, the area 1003 is updated.

A recommended color selection button group 1005 is preset for text. The button group 1004 is displayed in the applicable color. At startup, colors, such as white, black, gray, and red, are set as default values. When one button of the recommended color selection button group 1004 is selected, a color of the selected text is changed to the recommended color. In the processing of step 414, a color group in the coloration pattern is set to the recommended color. As a result, in the subsequent editing processing, as long as the recommended color is used, the processing can be continued without largely chancing coloration of the page design.

A button 105 is used to display a color selection screen. When the button 1005 is selected, a general-purpose color pallet screen is displayed. In the color selection screen, a user can freely select a color, such as separately designating HSV or RGB values, and the color set on the color selection screen is reflected to the selected text.

Second Exemplary Embodiment

The second exemplary embodiment is similar to the first exemplary embodiment except that a coloration pattern is automatically generated.

Figure 11:
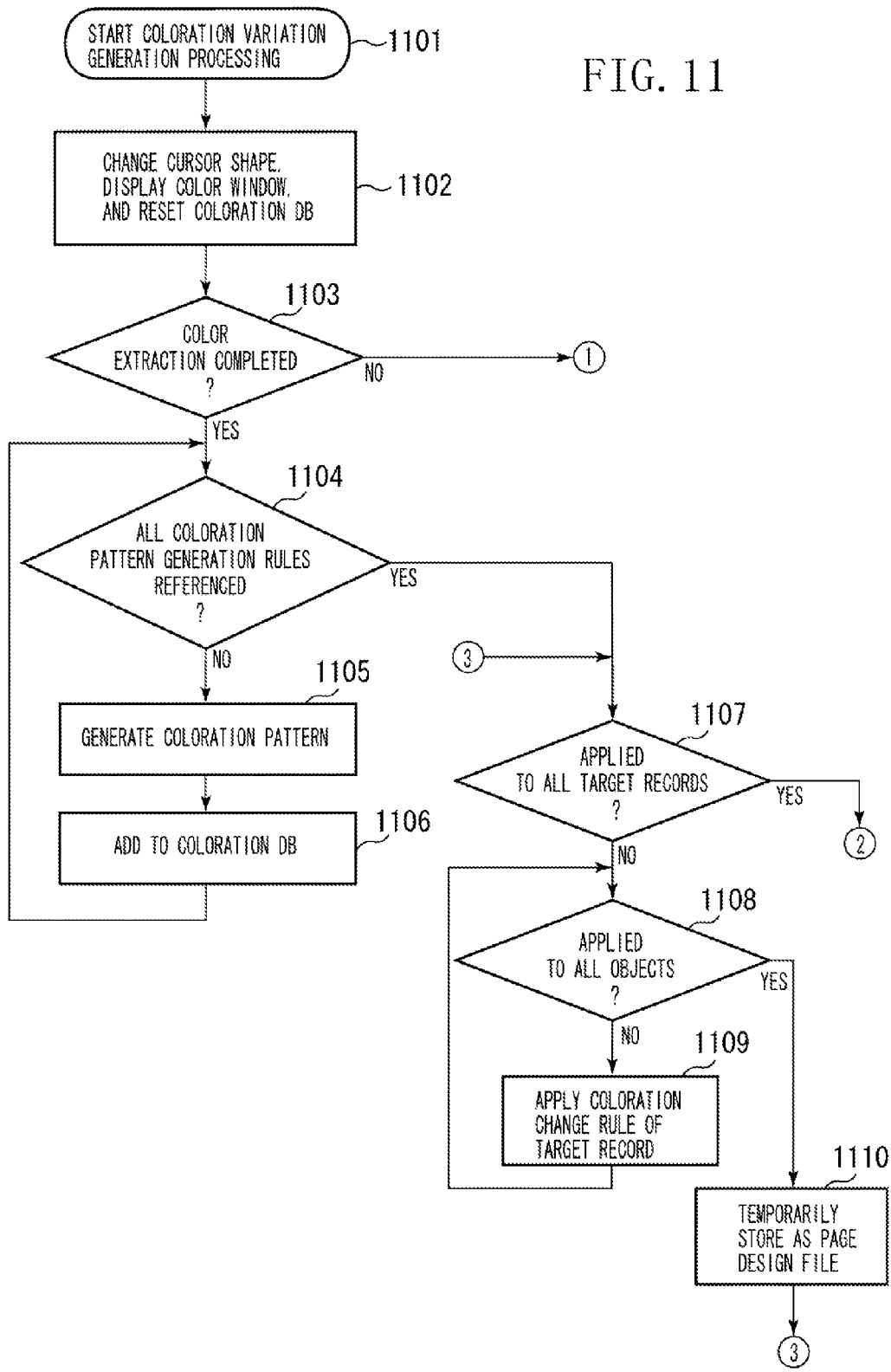
FIG. 11 illustrates the first half of a processing flow for generating a coloration variation based on an extracted color of a page design according to an exemplary embodiment of the present invention.
Figure 12:
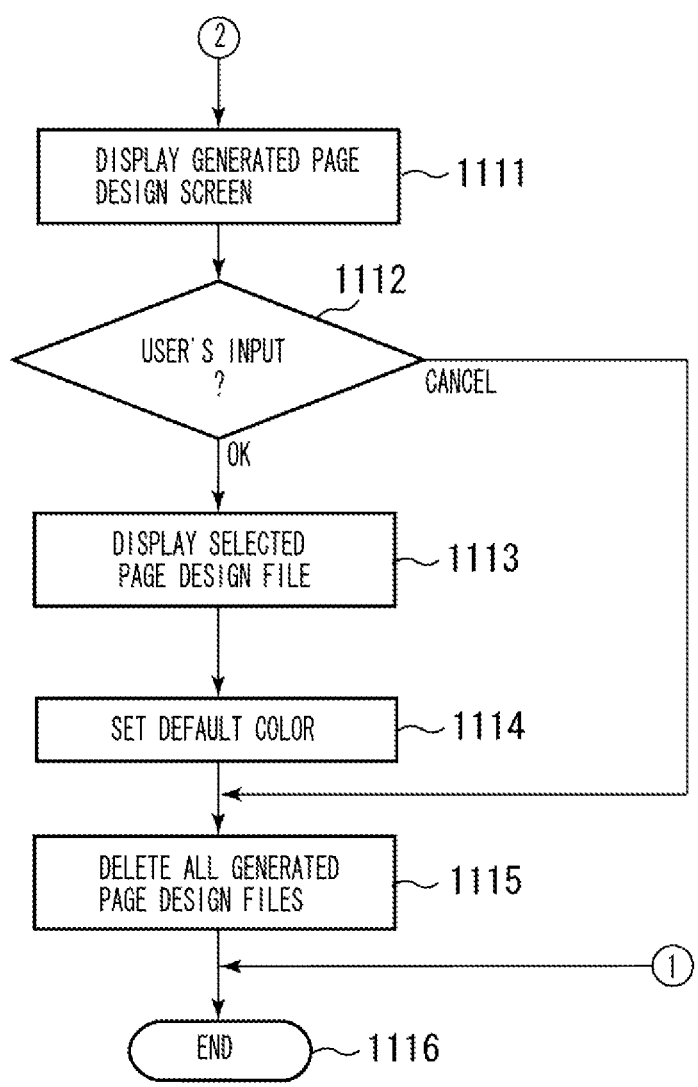
FIG. 12 illustrates the second half of the processing flow for generating the coloration variation based on an extracted color of a page design according to an exemplary embodiment of the present invention.

FIGS. 11 and 12 illustrate a processing flow for generating a coloration variation based on an extracted color of the page design according to an exemplary embodiment of the present invention. The application dynamically generates plural coloration patterns based on the coloration rule defined in a coloration pattern generation rule database, and generates a coloration variation reflecting colors of the coloration pattern.

In step 1101, coloration variation generation processing is started, in other words, the coloration variation generating button 103 is selected. In step 1102, similar to step 403, the application shifts to the color extraction mode and changes a shape of the cursor to a dropping pipette design, and displays the extraction color display screen.

In step 1103, the application checks whether a color to be extracted is selected. If selected (YES in step 1103), the application performs coloration pattern generation processing of steps 1104 to 1106. If not selected (NO in step 1103), the application advances to step 1115 to terminate coloration variation generation. A criterion of selecting a reference color is similar to that of step 403.

In steps 1104 to 1106, the application performs processing for generating a coloration pattern based on the reference color extracted in step 1103 and a rule defined in a coloration rule database as described below, and adding the generated pattern to the coloration DB. In step 1104, if some coloration rules remain to be applied (NO in step 1104), the application advances to step 1105. If all coloration rules are applied to generate coloration patterns (YES in step 1104), the application advances step 1107.

In step 1105, the application generates a coloration pattern based on the reference color according to the coloration pattern generation rule. The coloration pattern generation rule is described in detail below. Next, the application advances to step 1106, where the application adds the generated coloration pattern to the coloration database. The coloration database is similar to the database 601. That is, each record is composed of a combination of plural colors like a combination of the reference color, the sub color 1, and the sub color 2.

In steps 1107 to 1110, the application repeats processing for applying all coloration patterns defined in the coloration database to objects on the page design to generate page designs, and saving the generated designs in the temporary storage directory. In step 1107, if some coloration patterns remain to be applied (NO in step 1107), then in steps 1108, 1109, and 1110, the application repeatedly performs processing for changing coloration of each object. If no color pattern remains to be processed (YES in step 1107), the application advances to step 1111.

Steps 1108, 1109, and 1110 represent processing for applying colors of the coloration pattern in order on an object-by-object basis on the page design under editing. Steps 1108, 1109, and 1110 are similar to steps 406, 407, and 408. In addition, if an applicable color of the coloration pattern is changed, another variation can be generated as in the illustrated example of FIG. 4.

Steps 1111 to 1116 correspond to processing for displaying a coloration variation and a selected page design. Likewise, steps 1111 to 1116 are similar to steps 411 to 416.

FIG. 13 illustrates a coloration pattern generation rule database 1301 for use in the application according to an exemplary embodiment of the present invention.

As described above, in the coloration pattern generation processing, a coloration pattern is dynamically generated based on the rule defined in the coloration pattern generation rule database 1301. The coloration pattern generation rule is also defined based on knowledge about graphic design or coloration and how-to-design such that colors can be well balanced in terms of design.

As for the coloration rule, a color of similar hue, a similar color, or a complementary color is used in many cases. Even in the case of using a color of similar hue, the following variation and know-how are conceivable: a brightness difference is set, a pure color is used, or an achromatic color is used. In the coloration pattern generation rule database 1301, such a coloration pattern generating method is defined.

In each record of the coloration pattern generation rule database 1301, a definition of a reference color and a method of generating color 1 and color 2 are determined to generate a coloration pattern (in the present exemplary embodiment, the main color, the sub color 1, and the sub color 2). The reference color is used for the generated color 1 and generated color 2 and becomes a main color when added to the coloration database in step 1106. Likewise, colors generated based on the rule of the generated colors 1 and 2 become sub colors 1 and 2 on the same coloration database.

Record Nos. 1 to 4 are based on the coloration pattern generation rule in which the extracted color is used as a reference color. In record No. 1, a rule of generating a color of the same hue as the reference color, that is, generating a color with 30% higher brightness without changing the same H value is defined for the generated color 1. Since no value is defined in the generated color 2, the coloration pattern includes no sub color 2. In record No. 2, a rule of generating a color with the same hue and 30% higher/lower brightness, is defined for the generated colors 1 and 2. In record No. 3, a rule of generating a color with the same hue and 30% higher/lower saturation, is defined for the generated colors 1 and 2. In record No. 4, a rule of generating a color with the same hue, 30% higher brightness, and 30% lower saturation, is defined for the generated colors 1 and 2.

Record Nos. 5 to 12 are based on the coloration pattern generation rule in which a pure color is generated from the extracted color and the pure color is used as a reference color. In this example, it is assumed that the pure color can be generated by setting saturation of the extracted color to 100%.

The rule of record Nos. 5 and 6 is the same as that of record Nos. 1 and 2 except that the reference color is set to the pure color. In record No. 7, a rule of generating a color with a similar hue and 30% higher brightness, is defined for the generated color 1. The similar hue is a hue adjacent to the target hue in FIG. 7. According to the definition of the generated color 1 in record No. 7, a similar hue is defined as +1, so that a color of an adjacent hue in the direction of increasing the H value is generated. More specifically, the hue is divided into 10 equiangular fan-shaped groups, so that a color of an adjacent hue is a color having an H value 36 degrees larger than that of the reference color. Since the hue reaches the same position after a 360-degree roll, a remainder of (H+36) from 360 corresponds to the similar hue. In record No. 8, a color having a similar hue of a group on the right side and 30% lower brightness, is generated for the generated color 1, and a color having a similar hue of a group on the left side, that is, a color of (H−36), and 30% lower brightness, is generated for generated color 2. If a value of (H−36) is negative, 360+(H−36) is used as the similar hue. In record No. 9, a rule of defining a fixed color as the generated color 1 is defined. More specifically, HSV values representing light gray are directly defined. As a result, according to the generation rule of record No. 9, two coloration patterns, light gray and pure color as the extracted color are generated. In record No. 10, a coloration pattern including a color having the same hue and 30% higher brightness, and light gray as in No. 9 is generated. In record No. 11 and 12, a generation rule in which a complementary color is used is defined. The complementary color is defined as a color of an opposite hue group in FIG. 7, more specifically, a color having an H value added with 180. For example, a complementary color in the group h3 of FIG. 7 is a color of the group h8. Similar to the similar color, a remainder of (H+180) from 360 is the complementary color. In No. 11, a color that is a complementary color and has 30% higher brightness is generated for the generated color 1, and in No.

12, a color that is a complementary color and has 30% higher saturation is generated for the generated color 1.

In the coloration pattern generation rule of the coloration pattern generation rule database 1301, the degree of increase/decrease of brightness and saturation is fixed, but can be changed according to a reference color. For example, a rule that brightness and saturation of a reference color and each generated color are set at regular intervals on the brightness coordinate system and saturation coordinate system, can be applied. Further, a rule of generating a so-called opposite color, that is, color in a hue group adjacent to a complementary color, can be applied.

Third Exemplary Embodiment

A third exemplary embodiment describes processing for automatically analyzing a color in a designated area and displaying candidates for extracted color upon selection a color to be extracted prior to a step of applying a coloration pattern. That is, the processing corresponds to step 403 of FIG. 4 and step 1103 of FIG. 11. In the present exemplary embodiment, the processing after the selection of a color to be extracted can be performed with either a coloration pattern statically defined as in the first exemplary embodiment or a coloration pattern dynamically generated as in the second exemplary embodiment.

Figure 14:
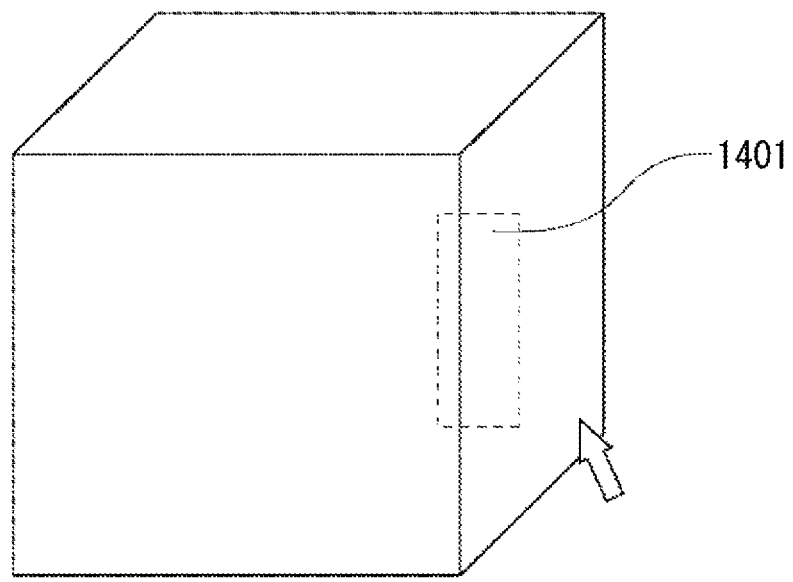
FIG. 14 illustrates an example in which an area is selected on a color-extraction-target object in a color extraction mode according to an exemplary embodiment of the present invention.

FIG. 14 illustrates an example in which an area is selected on a color-extraction-target object in the color extraction mode according to an exemplary embodiment of the present invention.

Figure 15:
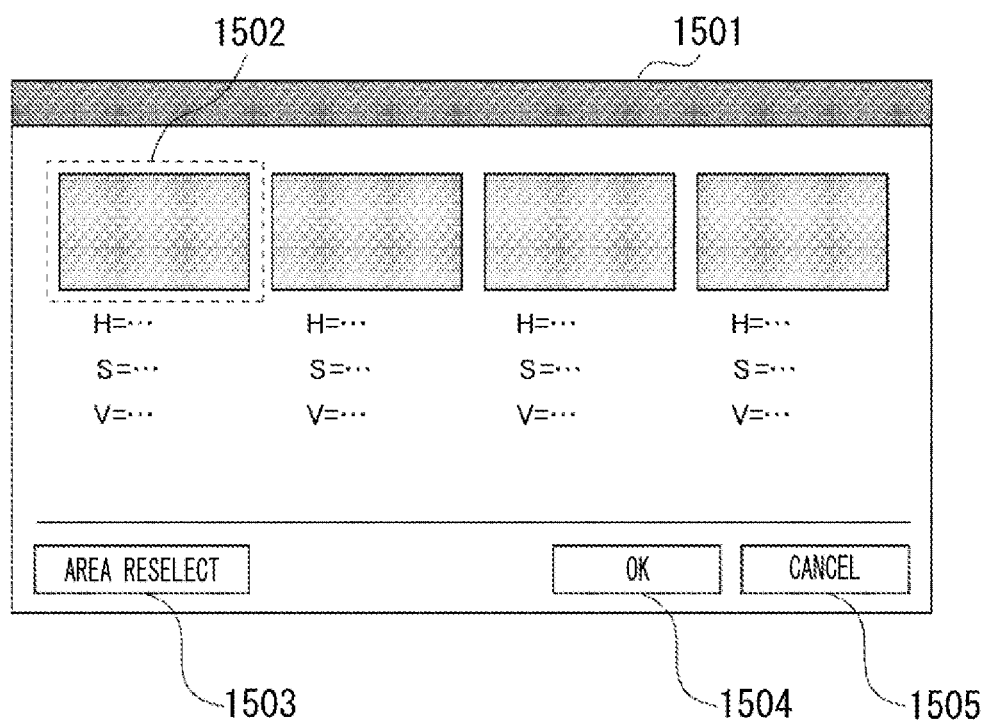
FIG. 15 illustrates an extraction color selecting screen according to an exemplary embodiment of the present invention.

The application shifts to the color extraction mode upon selecting the coloration variation generating button 103, and a user can select an arbitrary rectangular area on the page design under editing. An area 1401 in a side portion of the cube of a photo object 208 illustrated in FIG. 2 is selected by being dragged with a mouse. After the completion of mouse-dragging, an extraction color selection screen 1501 illustrated in FIG. 15 is displayed. By selecting a button or menu for canceling the color extraction mode, the color extraction mode is terminated and the coloration variation processing is cancelled.

FIG. 15 illustrates the extraction color selection screen 1501 according to an exemplary embodiment of the present invention.

In the extraction color selection screen 1501, main colors in the area 1401 are listed together with their HSV values. Color information of colors of all pixels in the area 1401 is thinned out to reduce the number of colors of the area. Among those, the top four colors having a large area are used as the main colors. Here, the number of main colors is 4, but can be increased or decreased.

At the time of extracting a color of a natural image like a photo as described above, a color varies between adjacent pixels in many cases. To accurately extract an intended color via mouse operations, a method of extracting a color on a pixel-by-pixel basis as in the first and second exemplary embodiments is effective. In the case of previously selecting a color and extracting the color, a method of designating an area to select a color to be extracted as in the third exemplary embodiment is effective.

Figure 16:
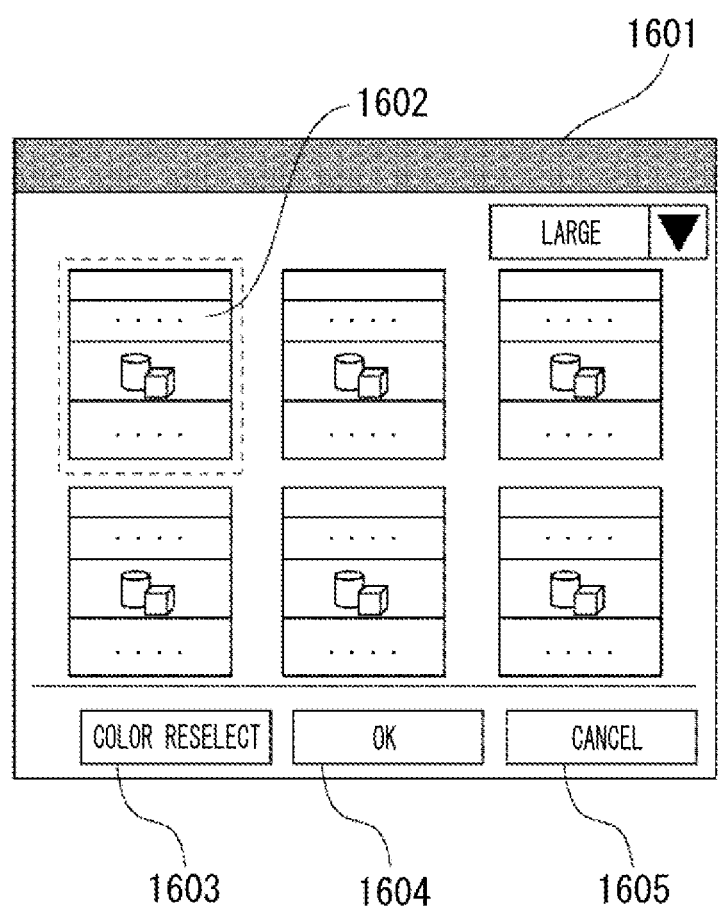
FIG. 16 illustrates a coloration variation display screen according to an exemplary embodiment of the present invention.

An extracted color 1502 is in a selected state on the screen 1501. Under this condition, if an OK button 1504 is selected, a color to be extracted is determined. Then, a coloration variation is generated based on the extracted color, and a coloration variation selection screen 1601 illustrated in FIG. 16 is displayed. If an AREA RESELECT button 1503 is selected, an area can be reselected as illustrated in FIG. 14. If a CANCEL button 1505 is selected, the color extraction mode is terminated.

FIG. 16 illustrates a coloration variation display screen 1601 according to an exemplary embodiment of the present invention. The coloration variation display screen 1601 is displayed after the completion of selecting the OK button 1504.

The coloration variation display screen 1601 is similar to the coloration variation display screen 104 illustrated in FIG. 1 except that a COLOR RESELECT button 1603 is provided. More specifically, in the coloration variation display screen 1601, coloration variations generated based on the extracted color selected on the extraction color selection screen 1501 are displayed in a thumbnail view. If an OK button 1604 is selected, a page design 1602 that is in a selected state is displayed on the preview screen. After the page design 1602 is displayed on the preview screen, the coloration variation generation function is terminated. If the COLOR RESELECT button 1603 is selected, the extraction color selection screen 1501 is displayed, so that a color to be extracted can be selected again. If a CANCEL button 1605 is selected, the coloration variation display screen 1601 is closed.

Figure 17:
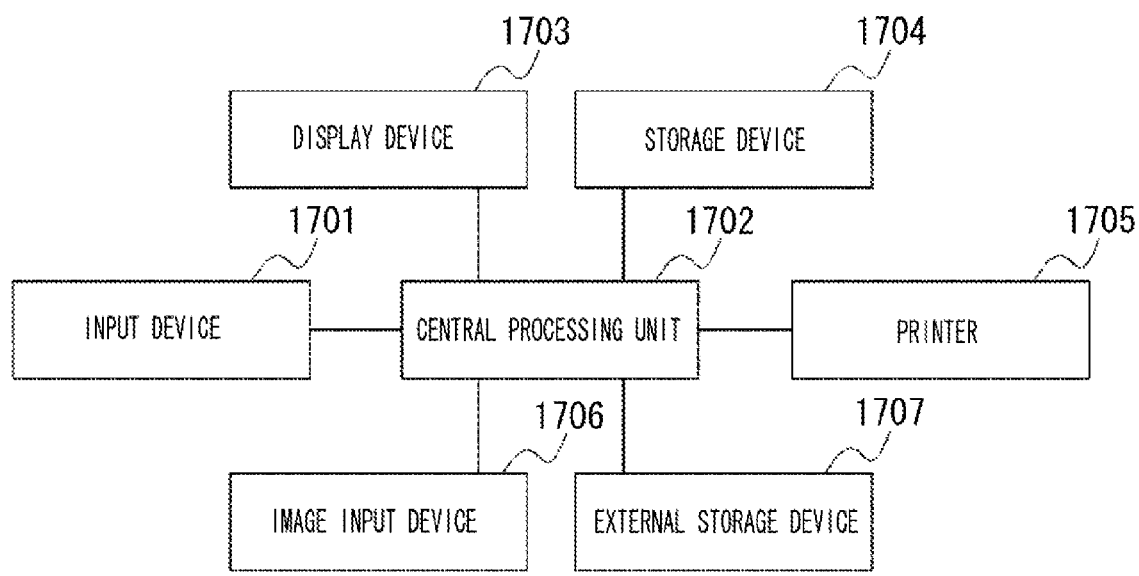
FIG. 17 is a block diagram illustrating an apparatus on which a page design application is executed according to an exemplary embodiment of the present invention.

FIG. 17 is a block diagram illustrating an apparatus on which the page design application is executed according to an exemplary embodiment of the present invention.

In FIG. 17, the apparatus includes an input device 1701, such as a keyboard or a mouse, a central processing unit 1702 configured to perform management control of the apparatus, input or correction of an image, and generation of edited data for printing, a display device 1703, a storage device 1704, such as a hard disk, configured to store an image data file or a corresponding image correction command history file, a printer 1705 configured to print edited data, an image input device 1706, such as a film scanner, a flatbed scanner, or a digital camera, and an external storage device 1707, such as a floppy disk drive or a storage medium for use with a digital camera.

In the above-described exemplary embodiments, processing for extracting a color of a photo has been described by way of example. However, a target object is not limited to a natural image like a photo but can be any image, such as a vector image or text in place of a raster image.

In the first exemplary embodiment, at the time of searching for the same color, not only the main color but the sub colors 1 and 2 can be used. If so, a wide variety of coloration variations can be generated.

Moreover, in the first and second exemplary embodiments, the following logic can be applied. In coloration processing for each object, an applicable color is determined according to an object type or an area ratio on the page design. For example, a sub color can be applied to a large element, such as a background object, and a main color can be applied to a small element, such as a rectangle object. In addition, additional processing can be performed to check a design just before generation of a coloration variation to equalize the tone of the entire image as much as possible. For example, if the background is light and the text is black in the design just before generation of a coloration variation, a color having high brightness and a color having low brightness out of the coloration pattern are applied to the background and text, respectively.

Furthermore, a user interface for finely adjusting color information of a color extracted in the first and second exemplary embodiments can be provided. For example, a screen having a slider for changing HSV values of the extracted color or a slider for changing RGB values can be displayed before the color selection and before step 404 or 1104.

According to the above-described exemplary embodiments, coloration variations can be automatically generated based on colors of an object, so that a design can be easily generated with desirable coloration. Furthermore, the coloration pattern is generated according to the definition of coloration pattern generation rule on the coloration pattern database based on a design rule, so that even a general user having little design knowledge can easily generate a desired coloration design. Moreover, after the generated coloration variation is displayed, a color of the coloration pattern used for generating the coloration variation is set as a default value, thus reducing such a situation that a balance between colors of the page design is lost in the subsequent editing processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-330693 filed Dec. 7, 2006, which is hereby incorporated by reference herein in its entirety.

What is claimed is:

1. An editing apparatus comprising:
    a memory configured to store object data;
    a designating unit configured to designate a first color of a first object of a plurality of objects in an image, according to an instruction by a user, wherein
        the first color corresponds to one or more parameter values in a color space, and
        the color space is divided into a plurality of reference regions;
        each reference region among the plurality of reference regions does not overlap any other reference region within the color space, and
        a coloration pattern is associated with each reference region among the plurality of reference regions,
    a determining unit configured to determine a second color different from the first color designated by the designating unit, based on the first color, wherein
        the determining unit is further configured to specify a particular reference region associated with the one or more parameter values corresponding to the first color; and
        the determining unit is further configured to determine that the second color is one of the colors in the coloration pattern associated with the specified particular reference region;
    a changing unit configured to change a color of a second object, different from the first object, of the plurality of objects included in the image, to the second color determined by the determining unit;
    a deciding unit configured to decide whether a color of a third object, used when the third object is newly added to the image in which the color of the second object is changed by the changing unit, is to be the first color or the second color; and
    at least one processor configured to function as at least one of the designating unit, the determining unit, the changing unit, and the deciding unit.

2. The editing apparatus according to claim 1, further comprising:
    a selecting unit configured to select at least one image from a plurality of images in which the color of the second object is changed by the changing unit, according to an instruction by a user.

3. The editing apparatus according to claim 1, wherein the determining unit performs processing for newly generating the second color based on the first color designated by the designating unit.

4. The editing apparatus according to claim 1, wherein the changing unit changes a plurality of colors corresponding to a plurality of areas of the second object by using a plurality of colors.

5. The editing apparatus according to claim 1, further comprising a memory comprising color data, wherein the determining unit performs processing for retrieving a second color based on the first color designated by the designating unit from the memory.

6. The editing apparatus according to claim 1, further comprising:
    a first display control unit configured to cause a display apparatus to display an image including a plurality of objects,
    wherein the designating unit designates the first color of the first object included in the image displayed by the first display control unit, according to an instruction by a user, and
    wherein the changing unit changes a color of the second object included in the image displayed by the first display control unit.

7. The editing apparatus according to claim 6, further comprising:
    a second display control unit configured to cause the display apparatus to display an image in which the color of the second object is changed by the changing unit.

8. The editing apparatus according to claim 1, wherein the deciding unit notifies the user of the first color or the second color from among a plurality of coloration candidates for the third object, and decide, in accordance with an instruction by the user based on a result of the notification, the color of the third object from among the plurality of coloration candidates.

9. The editing apparatus according to claim 8, wherein the changing unit changes colors of the plurality of objects included in the image with a plurality of patterns by using the first color and the second color.

10. The editing apparatus according to claim 1, wherein the deciding unit is configured to decide when a fourth object is newly added to the image, a color of the fourth object selected from the colors of the coloration pattern that is not second color or the first color.

11. The editing apparatus according to claim 1, wherein
    the first color is characterized by at least a first parameter value, a second parameter value and a third parameter value in a color space;
    the second color is characterized by the first parameter value, the second parameter value and a fourth parameter value that is proportional to the third parameter value.

12. The editing apparatus according to claim 1, wherein
    the first color is characterized by at least a first parameter value, a second parameter value and a third parameter value in a color space;
    the second color is characterized by the first parameter value, the second parameter value and a fourth parameter value that is analogous to the third parameter value.

13. The editing apparatus according to claim 1, wherein
    the first color is characterized by at least a first parameter value, a second parameter value and a third parameter value in a color space;

the second color is characterized by the first parameter value, the second parameter value and a fourth parameter value that is complementary to the third parameter value.

14. The editing apparatus according to claim 1, wherein
the first color is characterized by at least a first parameter value, a second parameter value and a third parameter value in a color space;
the second color is characterized by the first parameter value, a fifth parameter value that is proportional to the second parameter value and a fourth parameter value that is complementary to the third parameter value.

15. An editing method comprising:
designating a first color of a first object of a plurality of objects in an image, according to an instruction by a user, wherein
the first color corresponds to one or more parameter values in a color space, and
the color space is divided into a plurality of reference regions;
each reference region among the plurality of reference regions does not overlap any other reference region within the color space, and
a coloration pattern is associated with each reference region among the plurality of reference regions,
determining a second color different from the designated first color, based on the first color, wherein
specifying a particular reference region associated with the one or more parameter values corresponding to the first color; and
determining that the second color is one of the colors in the specified coloration pattern associated with the specified particular reference region;
changing a color of a second object, different from the first object, of the plurality of objects included in the image, to the determined second color; and
deciding whether a color of a third object, used when the third object is newly added to the image in which the color of the second object is changed, is to be the first color or the second color.

16. The method according to claim 15, further comprising:
selecting at least one image from a plurality of images in which the color of the second object is changed, according to an instruction by a user.

17. The method according to claim 15, wherein a combination of colors is determined by newly generating the second color based on the designated first color.

18. The method according to claim 15, wherein a plurality of colors corresponding to a plurality of areas of the second object is changed by using a plurality of colors.

19. A non-transitory storage medium storing a program that causes a computer to perform a method, the method comprising:
designating a first color of a first object of a plurality of objects in an image, according to an instruction by a user, wherein
the first color corresponds to one or more parameter values in a color space, and
the color space is divided into a plurality of reference regions;
each reference region among the plurality of reference regions does not overlap any other reference region within the color space, and
a coloration pattern is associated with each reference region among the plurality of reference regions,
determining a second color different from the designated first color, based on the first color, wherein
specifying a particular reference region associated with the one or more parameter values corresponding to the first color; and
determining that the second color is one of the colors in the specified coloration pattern associated with the specified particular reference region;
changing a color of a second object, different from the first object, of the plurality of objects included in the image, to the determined second color; and
deciding, whether a color of a third object, used when the third object is newly added to the image in which the color of the second object is changed, is to be the first color or the second color.

* * * * *